United States Patent
Wei et al.

(10) Patent No.: US 6,389,692 B1
(45) Date of Patent: May 21, 2002

(54) METHOD FOR REMOVING STUCK LOCKING PIN IN TURBINE ROTOR

(75) Inventors: Bin Wei, Mechanicville; Dennis Michael Gray, Delanson; John Francis Van Nest, Schenectady; John Peter Fura, Ballston Lake, all of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/736,171

(22) Filed: Dec. 15, 2000

(51) Int. Cl.[7] .............................................. B23P 15/00
(52) U.S. Cl. ................. 29/889.1; 29/402.03; 29/402.19
(58) Field of Search ......................... 29/889.1, 890.031, 29/402.03, 402.01, 402.19

(56) References Cited

U.S. PATENT DOCUMENTS

| | | | | |
|---|---|---|---|---|
| 3,487,733 A | * | 1/1970 | Townsend | 219/107 |
| 4,400,137 A | * | 8/1983 | Miller et al. | 29/889.1 |
| 4,451,959 A | * | 6/1984 | Miller et al. | 29/426.4 |
| 4,646,413 A | * | 3/1987 | Nall et al. | 29/402.03 |
| 4,829,660 A | * | 5/1989 | Everett et al. | 138/89 |
| 5,022,136 A | * | 6/1991 | Tremmel | 29/283.5 |
| 5,134,774 A | * | 8/1992 | Porter | 156/305 |
| 5,201,455 A | * | 4/1993 | Reynolds et al. | 228/119 |
| 5,624,513 A | * | 4/1997 | Desaulniers et al. | 156/247 |
| 5,664,328 A | * | 9/1997 | Fink et al. | 138/89 |
| 6,172,331 B1 | * | 1/2001 | Chen | 219/121.7 |
| 6,185,817 B1 | * | 2/2001 | Sims et al. | 29/256 |
| 6,237,766 B1 | * | 5/2001 | Hollingsworth | 190/103 |

\* cited by examiner

*Primary Examiner*—I Cuda-Rosenbaum
(74) *Attorney, Agent, or Firm*—Banner & Witcoff, Ltd.

(57) ABSTRACT

A stuck locking pin is removed from a turbine rotor by forming an aperture in the locking pin. The diameter of the aperture is less than the diameter of the locking pin, such that a thin shell portion remains in the locking pin receiving slot of the rotor. The locking pin then can be easily removed by any suitable means, such as by driving a high-strength metal rod into the aperture. The driving force stretches the thin shell portion, which easily separates from the rotor.

13 Claims, 1 Drawing Sheet

METHOD FOR REMOVING STUCK LOCKING PIN IN TURBINE ROTOR

BACKGROUND OF THE INVENTION

Locking pins are extensively used for locking buckets (blades) in landbase turbine rotors. A typical bucket support and bucket assembly includes a rotor or rotor disk having a series of slots in its outer periphery. A typical bucket includes an airfoil section, a base, and a root section. In such a configuration, the root section of the bucket slidably fits within a slot in the rotor or disk periphery. The bucket typically is locked into position on the rotor or disk by a locking pin that engages both the root of the blade and the rotor or disk. The locking pin typically is positioned in an aperture in the bottom surface of the slot. Both the locking pins and the rotor typically are made from stainless steel. A single rotor can have as many as several hundred such locking pins.

After prolonged service, locking pins occasionally become stuck in the rotor or rotor disk. Locking pins may become stuck in rotors, for example, as a result of deformation under rotor centrifugal force, surface gauging, or surface oxidation. Removing stuck locking pins from turbine rotors conventionally is a very laborious, costly, and time-consuming process. In addition to costs associated with removing the stuck locking pins, the time spent for removal also requires costly downtime of the turbine equipment. Furthermore, if a rotor is irreparably damaged during removal of a locking pin, the rotor must be replaced, resulting in considerable cost as the rotors are themselves expensive.

In one current approach, a mechanical drill is used to drill stuck locking pins, as illustrated in FIG. 1. Following mechanical drilling, a driving tool, such as a riveting gun or powder charge gun, applies force (f) to the end of a rod (5) to drive the remaining pin section (20) out from the locking pin receiving slot (15) of the rotor (10). This approach suffers from several drawbacks. One drawback is that the mechanical drilling operator needs to proceed with great caution to avoid drilling into the rotor (10) due to drill bit misalignment and deviation. The operator must carefully set up the drilling device for proper alignment, use a low drilling speed, and make multiple stops to check the aperture for possible damage to the rotor (10). This practice results in significantly long drilling times. Another drawback is that the driving force (f) exerted on the locking pin compresses the pin, which often causes swelling of the remaining pin section (20). Swelling makes removal much more difficult. It sometimes takes as much as eight hours to remove a single stuck pin (20).

There remains a need for a more efficient and cost-effective method for removing stuck locking pins from turbine rotors.

BRIEF SUMMARY OF THE INVENTION

The present invention is directed to a method of removing a stuck locking pin from a turbine rotor. The locking pin comprises an elongate, generally cylindrical member having a first end, a longitudinal centerline axis, a width dimension, and a length dimension. The stuck locking pin is disposed within and extends through a locking pin receiving slot of the rotor. The method comprises forming an aperture in the first end of the locking pin along its longitudinal centerline axis. The diameter of the aperture thus-formed is less than the width dimension (diameter) of the locking pin, such that a generally cylindrical shell portion remains in the locking pin receiving slot of the turbine rotor. The formation of the aperture in the foregoing manner minimizes compressive forces in the locking pin and/or stresses between the locking pin and the rotor, so as to facilitate easy removal of the shell portion.

The shell portion of the locking pin then is removed from the locking pin receiving slot using any suitable means. Preferably, the shell portion is removed by driving a high-strength metal rod into the aperture formed in the locking pin. The high-strength metal rod can be driven by any suitable means, such as a riveting gun. The driving force stretches the shell portion, which makes it relatively easy to remove the locking pin from the rotor. This is in contrast to the technique illustrated in FIG. 1 in which the pin section is compressed by mechanical drilling, making removal more difficult.

In accordance with a preferred embodiment of the invention, a high-speed electrodischarge machining (EDM) drill is used to form the aperture in the locking pin. High-speed electrodischarge machining not only is faster and more accurate than mechanical drilling, but also imparts no more than minimal stresses between the locking pin and the rotor, e.g., stresses due to compression of the locking pin. The accuracy of the EDM drill also reduces the risk of damage to the rotor, while avoiding the significant labor associated with the current mechanical drilling technique.

The method of the present invention enables stuck locking pins to be removed from turbine rotors in a more efficient and cost-effective manner. Stuck locking pins can be removed in substantially less time than is required by currently available techniques, often in as little as one half hour or less. Consequently, the amount of costly downtime needed for removing stuck locking pins is dramatically reduced. The amount of labor and labor costs associated with removing stuck locking pins also is significantly reduced. Furthermore, the risk of irreparable damage to the rotor is reduced.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF INVENTION

Figure 1:
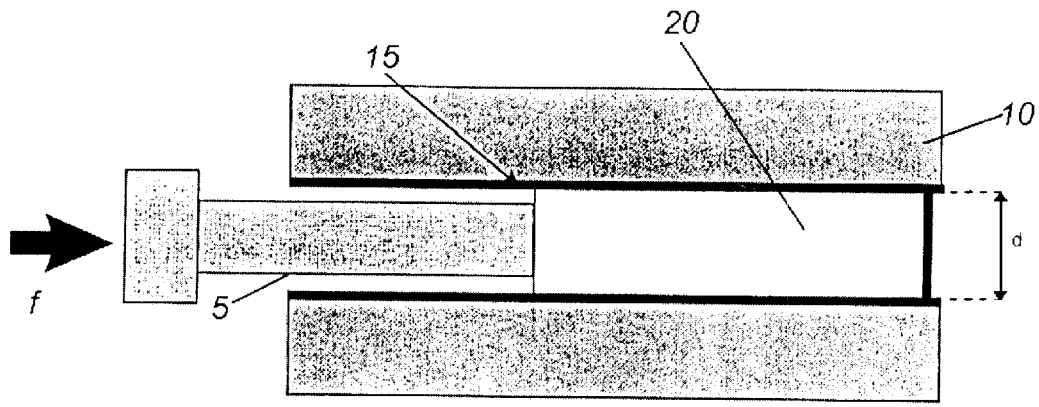
FIG. 1 is a cross-sectional view illustrating the removal of a locking pin from a turbine rotor using a mechanical drill in accordance with a prior art procedure.
Figure 2:
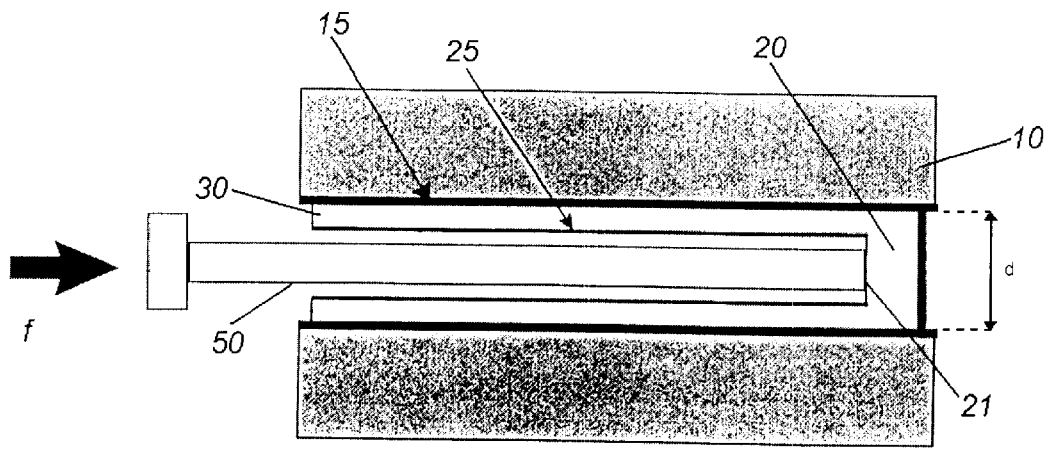
FIG. 2 is a cross-sectional view illustrating the removal of a locking pin from a turbine rotor using high-speed electro-discharge machining (EDM) and a high-strength driving rod in accordance with a preferred embodiment of the invention.

With reference to FIG. 2, a preferred embodiment of the method of the present invention comprises forming an aperture (25) in a stuck locking pin (20) disposed within and extending at least partially through a locking pin receiving slot (15) of a turbine rotor (10). The aperture (25) extends along at least a portion of the length of the locking pin (20). As illustrated in FIG. 2, the diameter of the aperture (25) is less than the width dimension or diameter (d) of the locking pin (20), such that a generally cylindrical shell portion (30) remains in the locking pin receiving slot (15) of the turbine rotor (10). Preferably, the aperture (25) extends through at least one half of the length, but less than the entire length, of the locking pin (20), to enable the shell portion (30) to be removed more easily. The thickness of the shell portion (30) depends on such factors as the width (diameter) (d) of the locking pin (20), and preferably is about 50 mils or less, and more preferably from about 5 to 50 mils. The locking pin (20) usually has a length of from about 4 to 12 inches and a diameter of from about 0.1 to 0.7 inches, more usually from about 0.2 to about 0.6 inches. Pins having diameters somewhat greater than 0.7 inches are used in some applications.

The aperture (25) is formed in a manner to minimize compressive forces in the locking pin (20) and/or stresses between the locking pin (20) and the rotor (10), so as to facilitate easy removal of the locking pin (20) from the rotor (10). The shell portion (30) and any remaining portions of the locking pin (20) can be removed from the rotor (10) using any suitable means. In a preferred embodiment, the shell portion (30) is removed by driving a high-strength metal rod (50) into the aperture (25) formed in the locking pin (20). The high-strength metal rod (50) can be driven by any suitable manual or mechanized means, such as a hammer or a riveting gun (not illustrated). The driving force (f) stretches the shell portion (30), which makes it relatively easy to remove the shell portion (30) and the remaining portion of the locking pin (20) from the rotor (10).

In a preferred embodiment of the present invention, a high-speed electrodischarge machining (EDM) drill is used to form the aperture (25) in the locking pin (20). The accuracy of EDM drilling permits the locking pin (20) to be drilled to a predetermined depth, leaving a very thin shell portion (30) without damaging the rotor (10). In a typical EDM drilling process, an electrode is placed in a spaced relationship with the workpiece from which it is desired to erode material by the discharge of current from the electrode to the workpiece. The electrode can be formed of a copper alloy or of any other suitable material. The drilling area is flushed with a water-based dielectric such as deionized water or simply with tap water. The electrode holder is electrically connected to a negative terminal of a DC power source. The electrode is advanced toward the workpiece until the electrode reaches a position such that the dielectric of the gap between the electrode and the workpiece is broken down by an erosive electrical intermittent discharge. This discharge causes particles of material to be removed from the workpiece. Further pulsating discharges continue to erode material until an aperture of a desired length is formed, after which time the electrode is withdrawn from the proximity of the workpiece. Preferably, the electrode used in the method of the present invention has a generally tubular or cylindrical configuration. Other details of EDM drilling will be apparent to persons of ordinary skill in the art.

In accordance with a preferred embodiment of the invention, after the aperture (25) has been formed in the locking pin (20), a high strength metal rod (50) is plunged into the aperture (25). Any suitable manual or mechanized driving device, such as a hammer or a conventional riveting gun (not illustrated), can be used to apply force (f) to the end of the rod (50). As illustrated in FIG. 2, the high-strength metal rod (50) exerts force onto the locking pin (20) at the distal end (21) of the aperture (25), so that the shell portion (30) is stretched (or "pulled") under the driving force (f)

The thickness of the shell portion (30) permits the driving force (f) to cause some deformation in the shell portion (30). Deformation in the shell portion (30) avoids or substantially avoids pin swell. Deforming the shell portion (30), while avoiding or substantially avoiding swelling, advantageously permits easier removal of the locking pin, e.g., the shell portion (30) and the remaining locking pin portion (20), from the rotor (10). The shell portion (30) should have a thickness that is at least a minimum thickness that resists breakage when the driving force (f) is applied, but not more than a maximum thickness above which the shell portion (30) does not undergo deformation under application of the driving force (f). The thickness of the shell portion (30) also depends on the width (diameter) (d) of the locking pin (20). It has been found that, for typical rotor and locking pin materials used under typical conditions, a shell thickness: of about 5 to 50 mils most often is sufficient.

The depth (length) of the aperture (25) also should be suitably selected to promote useful pin deformation that, in turn, permits the pin (20) to be more easily separated from the rotor (10). In general, a deeper (longer) aperture (25) makes it easier for the locking pin (20) to be separated from the rotor (10). The tradeoff associated with drilling a deeper aperture (25) is that more time generally is needed. It is preferred that the depth of the aperture (25) is at least about one half of the length, but less than the entire length, of the locking pin (20), so that the driving rod (50) can engage the distal end (21) of the aperture (25), as illustrated in FIG. 2.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method of removing a stuck locking pin from a turbine rotor, said locking pin comprising an elongate, generally cylindrical member having a first end, a longitudinal centerline axis, a width dimension, and a length dimension; said locking pin disposed within and extending through a locking pin receiving slot of said turbine rotor; the method comprising:

providing an electrodischarge machining drill having a generally cylindrical electrode;

forming an aperture in the first end of said locking pin with said electrodischarge machining drill; wherein said aperture extends along the longitudinal centerline axis of said locking pin; wherein said aperture has a diameter less than the width dimension of said locking pin, such that a generally cylindrical shell portion remains in said locking pin receiving slot of said turbine rotor;

providing a high-strength metal rod having a diameter not greater than the diameter of said aperture formed in said locking pin; and driving said high-strength metal rod into said aperture to remove said shell portion from said locking pin receiving slot of said turbine rotor.

2. The method of claim 1 wherein said shell portion has a thickness of from about 5 to about 50 mils.

3. The method of claim 2 wherein said locking pin has a width dimension of about 0.1 to about 0.7 inches.

4. The method of claim 1 wherein said high-strength metal rod is driven by a riveting gun.

5. The method of claim 1 wherein said high-strength metal rod is driven by a hammer.

6. The method of claim 1 wherein said aperture extends along at least about one of the length dimension of said locking pin.

7. A method of removing a stuck locking pin from a turbine rotor, said locking pin comprising an elongate, generally cylindrical member having a first end, a longitudinal centerline axis, a width dimension, and a length dimension; said locking pin disposed within and extending through a locking pin receiving slot of said turbine rotor; the method comprising:

forming an aperture in the first end of said locking pin, wherein the aperture extends along the longitudinal centerline axis of said locking pin, and wherein said aperture has a diameter less than the width dimension of said locking pin such that a generally cylindrical shell portion remains in said locking pin receiving slot of said turbine rotor; and removing said shell portion from said locking pin receiving slot of said turbine rotor.

8. The method of claim 7 wherein said shell portion has a thickness of from about 5 to about 50 mils.

9. The method of claim 8 wherein said locking pin has a width dimension of from about 0.1 to about 0.7 inches.

10. The method of claim 7 wherein said shell portion is removed by driving a high-strength metal rod into the aperture formed in said locking pin.

11. The method of claim 10 wherein said high-strength metal rod is driven by a riveting gun.

12. The method of claim 10 wherein said high-strength metal rod is driven by a hammer.

13. The method of claim 7 wherein said aperture extends along at least about one half of the length dimension of said locking pin.

* * * * *